No. 768,499. PATENTED AUG. 23, 1904.
S. S. WILLIAMSON.
ROTARY FAN.
APPLICATION FILED JULY 1, 1903.
NO MODEL.

Witnesses:
Inventor:
Samuel S. Williamson

No. 768,499. Patented August 23, 1904.

UNITED STATES PATENT OFFICE.

SAMUEL S. WILLIAMSON, OF PHILADELPHIA, PENNSYLVANIA.

ROTARY FAN.

SPECIFICATION forming part of Letters Patent No. 768,499, dated August 23, 1904.

Application filed July 1, 1903. Serial No. 163,844. (No model.)

*To all whom it may concern:*

Be it known that I, SAMUEL S. WILLIAMSON, a citizen of the United States, residing at Philadelphia, county of Philadelphia, and State of Pennsylvania, have invented a certain new and useful Improvement in Rotary Fans or Blowers, of which the following is a specification.

My invention relates to a new and useful improvement in rotary fans or blowers, and has for its object to provide a fan or blower which will act in conjunction with a deflector so as to cause the air to be projected radially from the fan in all directions.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1:
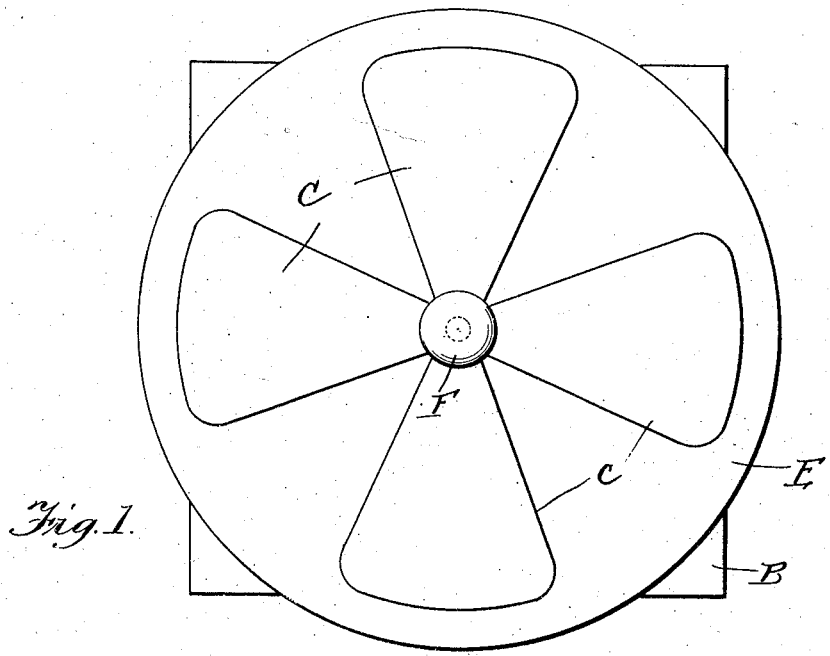
Figure 2:
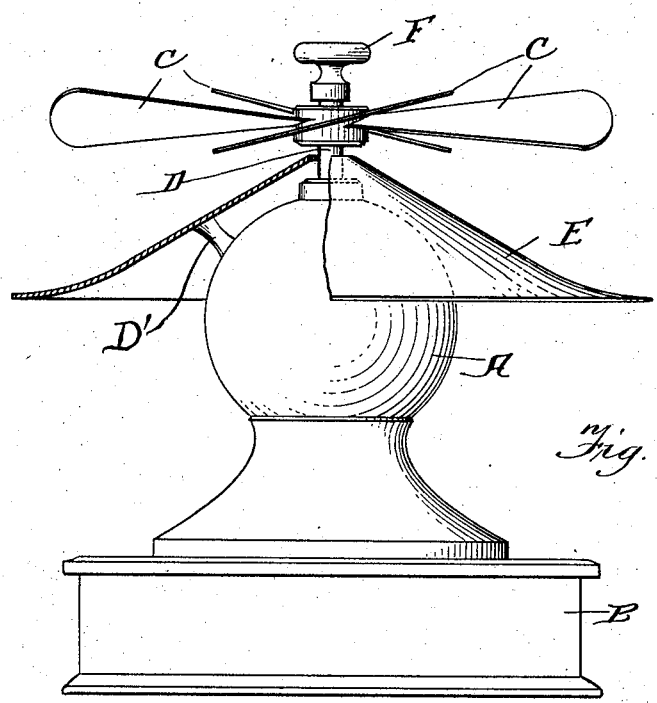

Figure 1 is a plan view of my improved fan; Fig. 2, a side elevation of the same, a portion of the deflector being broken away to show the construction.

In rotary fans, and especially electric fans, it is well known that the air is only projected from the fan in a straight line, and the only parties receiving a benefit from the same are those sitting or standing directly in front of it. Numerous devices have been tried for distributing the air, such as pivoting the body of the fan and having the same rotate; but all such devices are either impractical or comparatively expensive and liable to get out of order very easily.

In my improved fan the spindle of the fan or blower is vertical, and the air is projected out radially from the fan in all directions. In the case of a blower the same might be inclosed in a casing provided with apertures around the same, the air being drawn in at the top and projected through the apertures by the blower radially. In rotary fans I distribute the air by means of a deflector. This deflector may be located above or below the blades, and the air coming in contact with the deflector will be projected outwardly radially therefrom.

In the drawings, A represents the body of an electric fan.

B is the base, in which is designed to be placed a battery for operating the fan, thus making the fan portable.

C represents the blades of the fan, secured to the upright spindle D. These blades are so turned as to throw the air downward against the deflector E, this deflector being in the form of a truncated cone, the outer edges of the deflector being flared so that the air will be projected horizontally. This deflector may be supported in any desired manner on the body of the fan, and of course, if desired, the deflector could be above the blades of the fan, in which case the blades would be so formed as to throw the air upward and the deflector could be shaped so as to project the air either upward or downward at an angle as well as horizontally.

F is a handle secured upon the upper end of the fan for moving the same from place to place. If desired, the deflector E could be made a part of a casing which would surround the entire body of the fan and base; but of course this is a detail which does not enter into my invention. The deflector is supported by posts D′, which posts are attached to the body A of the fan.

Of course I do not wish to be limited to the exact construction here shown, as slight modifications could be made without departing from the spirit of my invention.

Having thus fully described my invention, what I claim as new and useful is—

In a fan, a body, and base, a shaft projecting from the body, a handle on the end of the shaft, a fan on the shaft, a deflector, a post on the body supporting the deflector, the said deflector having an open top for the reception of the shaft, substantially as described.

In testimony whereof I have hereunto affixed my signature in the presence of two subscribing witnesses.

SAMUEL S. WILLIAMSON.

Witnesses:
MARY E. HAMER,
H. B. HALLOCK.